(12) United States Patent
Chang et al.

(10) Patent No.: US 7,717,063 B2
(45) Date of Patent: May 18, 2010

(54) SPREADING DEVICE FOR FEEDSTUFF

(75) Inventors: Shih-Ming Chang, Cixi Zhejiang (CN); Jin-Jun Cao, Zhejiang (CN)

(73) Assignee: Cixi Haosheng Electronics & Hardware Co., Ltd., Cixi Zhejiang (CN)

( * ) Notice: Subject to any disclaimer, the term of this patent is extended or adjusted under 35 U.S.C. 154(b) by 97 days.

(21) Appl. No.: 12/040,928

(22) Filed: Mar. 3, 2008

(65) Prior Publication Data

US 2009/0217880 A1 Sep. 3, 2009

(51) Int. Cl.
*A01K 5/00* (2006.01)

(52) U.S. Cl. .................. 119/57.91; 119/51.13; 239/687

(58) Field of Classification Search .............. 119/51.11, 119/57.91, 51.13, 51.01, 51.04; 239/7, 650, 239/668, 681, 682, 687; 222/181.1, 185.1, 222/650

See application file for complete search history.

(56) References Cited

U.S. PATENT DOCUMENTS

| | | | |
|---|---|---|---|
| 423,997 A * | 3/1890 | Henrichsen | 239/687 |
| 4,986,220 A * | 1/1991 | Reneau et al. | 119/57.91 |
| 6,375,035 B1 * | 4/2002 | Munroe | 222/1 |
| 6,763,781 B1 * | 7/2004 | Norrell | 119/57.91 |
| 7,404,376 B2 * | 7/2008 | Hernandez | 119/57.91 |
| 2006/0283396 A1 * | 12/2006 | Hernandez | 119/51.13 |

* cited by examiner

*Primary Examiner*—Michael R Mansen
*Assistant Examiner*—Brian M. O'Hara
(74) *Attorney, Agent, or Firm*—Leong C. Lei

(57) ABSTRACT

A tank of the spreading device is rotated by a driving device. The tank contains a number of side boards, each of which is composed of a static plate and a door plate hinged to the static plate. The hinge joining the door and static plates has an elastic element preventing the door plate from being opened outward. When the tank is rotated at a high speed, a centrifugal force on the feedstuff inside the tank is strong enough to push the door plates open and the feedstuff is thereby automatically cast out. By varying the speed of the tank's rotation, the feedstuff could be cast for various distances, thereby achieving efficient and effective distribution of the feedstuff.

2 Claims, 5 Drawing Sheets

SPREADING DEVICE FOR FEEDSTUFF

TECHNICAL FIELD OF THE INVENTION

The present invention generally relates to devices for distributing feedstuff, and more particularly to a device spreading feedstuff for various distances through the utilization of the centrifugal force.

DESCRIPTION OF THE PRIOR ART

A problem often arising from breeding a large number of domestic fowls or animals is how to distribute the feedstuff efficiently and effectively. Conventionally, the feedstuff is placed in an elongated trough for the fowls or animals to take by themselves. However, the fowls or animals often get hurt when they are crowded around the trough and compete for the feedstuff. In addition, the weak or small ones are usually deprived of their shares by the strong or big ones.

SUMMARY OF THE INVENTION

The primary purpose of the present invention is to provide a novel device which utilizes the centrifugal force to spread the feedstuff in a tank automatically for different distances.

According to the present invention, a tank rotated by a driving device contains a number of side boards around a circumference of a bottom board. The side boards and the bottom boards jointly form a storage space for the feedstuff. Each side board is composed of a static plate and a door plate hinged to the static plate. The hinge joining the door and static plates has an elastic element preventing the door plate from being opened outward.

When the tank is rotated at a high speed, the centrifugal force on the feedstuff is strong enough to push the door plates open and the feedstuff is thereby automatically cast out. By varying the speed of the tank's rotation, the feedstuff could be cast for various distances, thereby achieving efficient and effective distribution of the feedstuff.

The foregoing objectives and summary provide only a brief introduction to the present invention. To fully appreciate these and other objects of the present invention as well as the invention itself all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
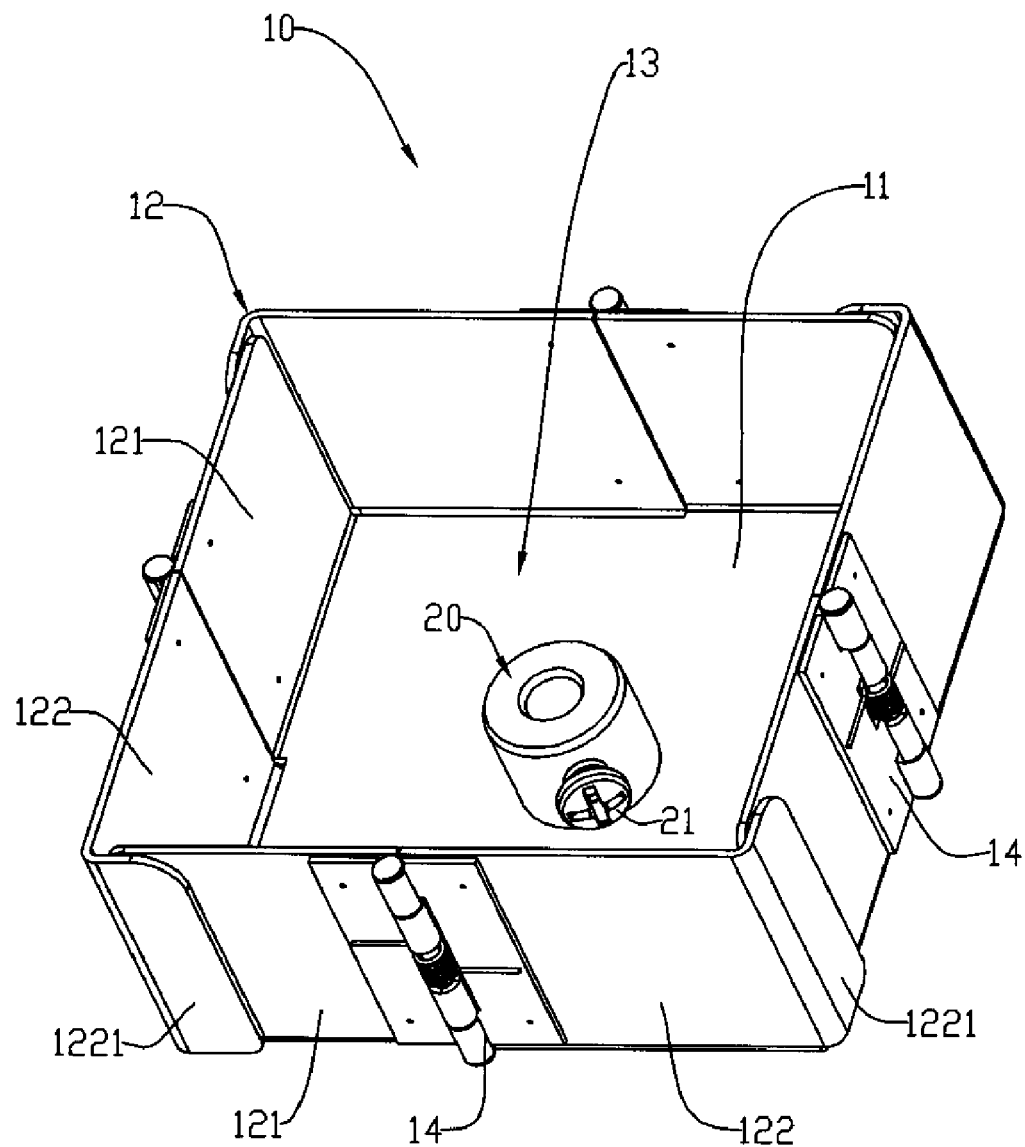
FIG. 1 is a perspective diagram showing a spreading device according to an embodiment of the present invention.
Figure 2:
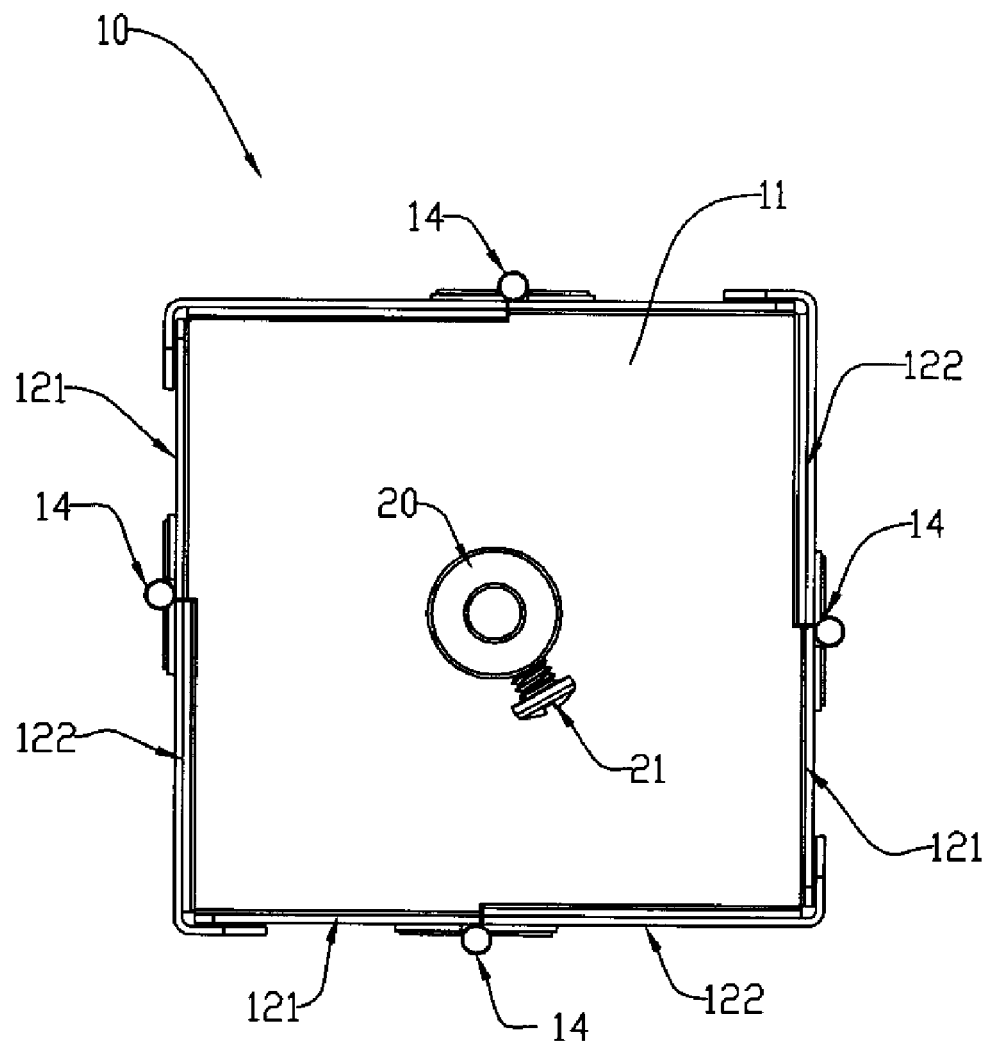
FIG. 2 is a top-view diagram showing the spreading device of FIG. 1.

As shown in FIGS. 1 and 2, a spreading device according an embodiment of the present invention mainly contains a tank 10 having an open top. The tank 10 is composed of a bottom board 11 and a number of side boards 12. The side boards 12 are positioned along a circumference of a top surface of the bottom board 11 so that a storage space 13 for feedstuff is formed. The spreading device further contains a tubular joining member 20 inside the storage space 13 and on a central spot of the bottom board 11. The bottom board 11 has a through hole (not shown) beneath the joining member 20 so that the joining member 20, and thereby the tank 10, could be fixed to a spinning axle of a driving device (not shown) such as a motor so that the tank 10 could be rotated by the driving device.

Each side board 12 contains at least a static plate 121 and at least a door plate 122. A side of each door plate 122 is hinged to a side of a static plate 121 so that the door plate 122 could spin with respect to the corresponding static plate 121.

Figure 3:
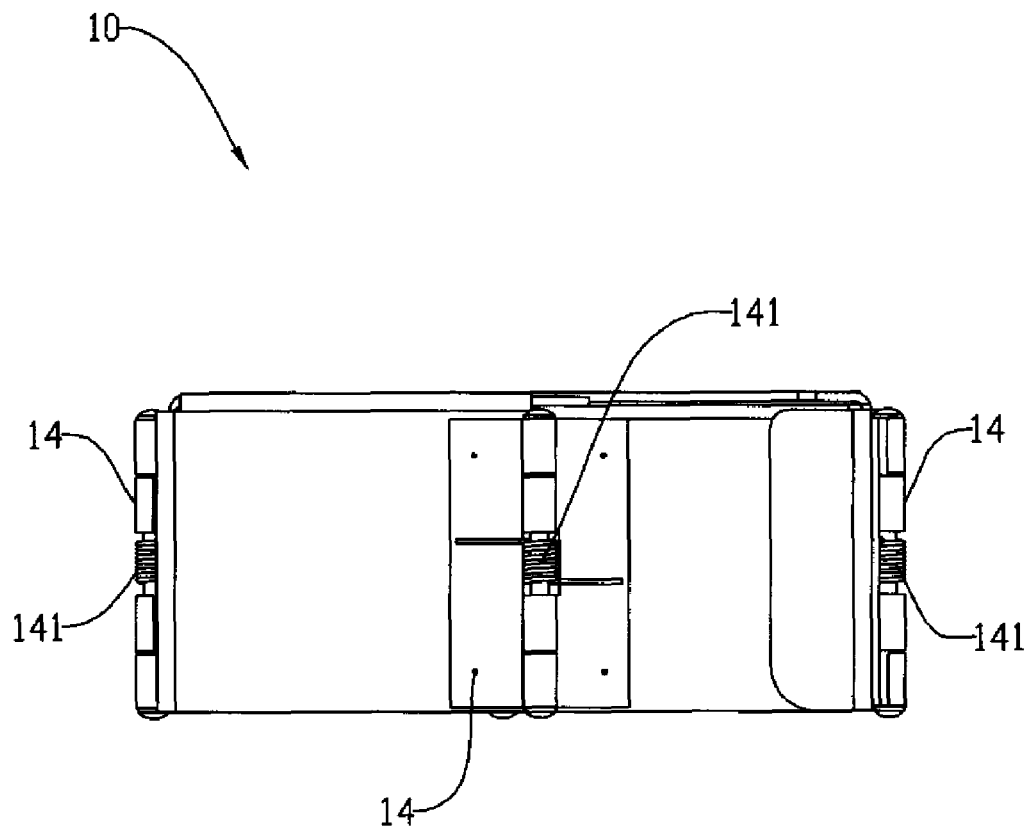
FIG. 3 is a side-view diagram showing the spreading device of FIG. 1.

As further shown in FIG. 3, each door plate 122 is joined to a static plate 121 by a hinge 14. The hinge 14 contains an elastic element 141 which exerts a force against the door plate 122 to prevent it from being opened outward. When the tank 10 is static or is rotated at a low speed by the driving device, the door plates 122 would remain shut by the elastic elements 141 of their hinges 14. However, when the tank 10 is rotated at a high speed, the feedstuff inside the storage space 13 would undergo a centrifugal force strong enough to push the door plates 122 open. The feedstuff is thereby cast out automatically. Additionally, by varying the rotational speed of the tank 10, the feedstuff could be cast out for different distances, thereby achieving efficient and effective distribution of the feedstuff.

Figure 4:
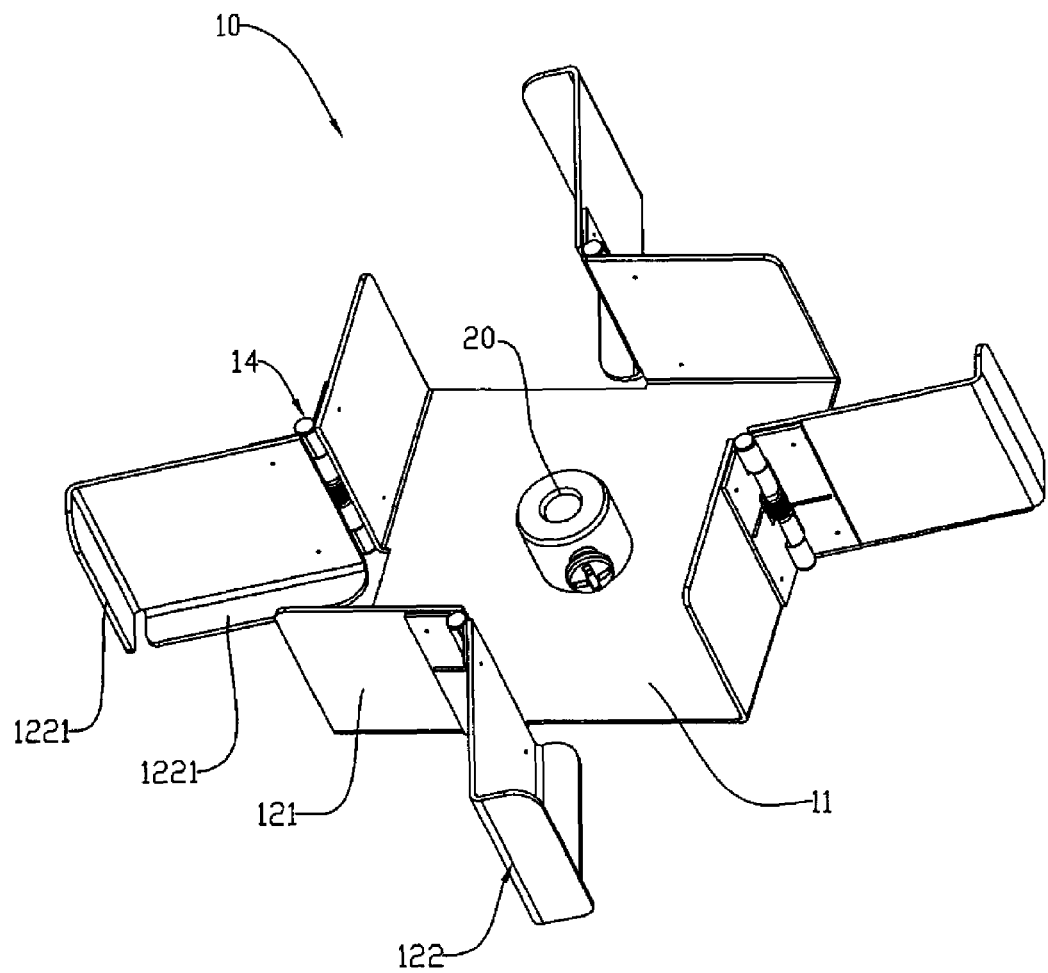
FIG. 4 is a perspective diagram showing the spreading device of FIG. 1 when the door plates are open.
Figure 5:
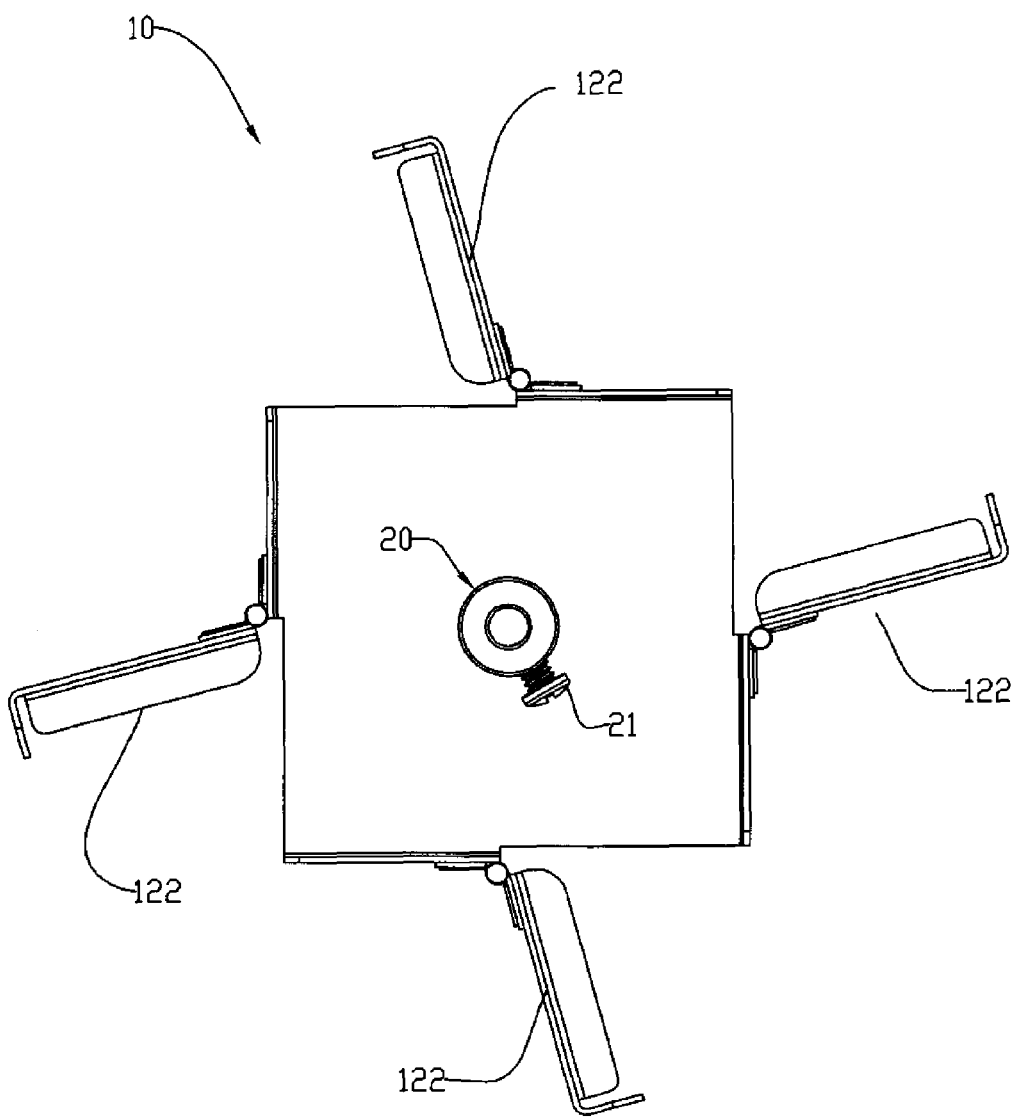
FIG. 5 is a top-view diagram showing the spreading device of FIG. 1 when the door plates are open.

As shown in FIGS. 4 and 5, along a bottom edge and along an edge opposing to the hinge 14 of a door plate 122, the door plate 122 is bended towards the bottom board 11 and an adjacent static plate 121, respectively, to form guard pieces 1221. The guard pieces 1221 are to prevent the feedstuff inside the storage space 13 from leaking when the tank 10 is static or is rotated at a low speed.

On a side wall of the joining member 20, a locking element 21 is provided for penetrating through the joining member 20 so as to tightly join the joining member 20 and the axle of the driving device together.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A spreading device for feedstuff comprising:

a tank having a bottom board and a plurality of vertical side boards along a circumference of a top surface of said bottom board thereby forming a storage space for feedstuff, each of said vertical side boards comprising a vertical static plate and a vertical door plate having a vertical side connected to a vertical side of said vertical static plate by a hinge thereby enabling said vertical door plate to rotate with respect to said vertical static plate, said hinge having an elastic element for preventing said vertical door plate from being opened outward, said vertical door plate having a bottom edge which is bent towards said bottom board to form a first guard plate, said door plate having an edge which is opposite to said hinge and is bent towards an adjacent static plate to form a second guard plate; and a tubular joining member mounted inside said storage space at a central spot of said bottom board for attaching to a rotational driving device through said bottom board;

wherein when said joining member and said tank are rotated by said driving device, a centrifugal force on said feedstuff pushes said door plate open and said feedstuff is thereby cast out automatically.

2. The spreading device for feedstuff as claimed in claim 1, wherein said joining member comprises a locking element on a circumference of said joining member for locking said joining member to an axle of said driving device.

* * * * *